United States Patent [19]

Wienert

[11] Patent Number: 4,613,363

[45] Date of Patent: Sep. 23, 1986

[54] PROCESS OF MAKING SILICON, IRON AND FERROALLOYS

[76] Inventor: Fritz O. Wienert, 394 Roosevelt Ave., Niagara Falls, N.Y. 14305

[21] Appl. No.: 807,498

[22] Filed: Dec. 11, 1985

[51] Int. Cl.$^4$ .............................................. C22B 4/00
[52] U.S. Cl. ...................................... 75/10.62; 75/3; 75/10.63
[58] Field of Search .................. 75/10 R, 11, 3–5

[56] References Cited

U.S. PATENT DOCUMENTS

| | | | |
|---|---|---|---|
| 441,174 | 11/1890 | Lash | 75/3 |
| 1,711,153 | 4/1929 | McIntire | 75/4 |
| 2,075,210 | 12/1933 | Kugener | 75/4 |
| 2,805,930 | 9/1957 | Udy | 75/11 |
| 2,830,891 | 4/1958 | Udy | 75/11 |
| 3,215,522 | 11/1965 | Kuhlmann | 75/11 |
| 3,224,871 | 12/1965 | Collin | 75/11 |
| 3,276,859 | 10/1966 | Collin | 75/11 |

*Primary Examiner*—Peter D. Rosenberg
*Attorney, Agent, or Firm*—Donald C. Studley

[57] ABSTRACT

The present invention relates to the use of self-reducing compacts as a feed material for a submerged electric arc furnace. The compacts are comprised of finely-divided carbon-reducible oxide materials, such as, the oxides of silicon, iron, manganese, chromium or nickel, or mixtures thereof, and a carbonaceous source material. The compacts may also contain a slag-forming additive. The particle size of the components is less than about 0.2 mm. The particles are mixed in appropriate weight ratios to yield the desired product, for example, silicon, iron, or iron alloy. Water is incorporated into the mixture by alternately stirring and pressing to produce densified agglomerates. Sufficient water is added that the subsequent compaction step squeezes out at least about 1% of the incorporated water. The agglomerates are compacted, suitably by means of a double rolls, which exert a maximum momentary pressure of from about 300 to about 4000 kg per linear cm of roll width, to form a compacted product. The resultant compacted product is eminently suited to use as a feed material for a submerged arc furnace.

11 Claims, No Drawings

PROCESS OF MAKING SILICON, IRON AND FERROALLOYS

BACKGROUND OF THE INVENTION

The present invention relates to the production of metals, metalloids or their alloys by the use of self-reducing compacts containing carbon-reducible metal oxides and carbonaceous matter when the compacts are subsequently smelted in a submerged arc furnace. Examples of the products produced are: silicon, iron and ferroalloys.

It is known in the art to reduce iron ore in the form of lumps and pellets made from fine iron ores using hot carbon monoxide and hydrogen and to subsequently melt the resulting sponge iron in an electric arc furnace. It is also known in the art to mix relatively large pieces of iron ore, pellets of iron ore or sinters thereof with pieces of coke and coal and smelt such mixtures in a submerged arc furnace. Further it is known to make pellets from a mixture of fine chromite ore and fine particles of coke or anthracite coal with the incoproration of a binder and to partially reduce such pellets in a rotary kiln. The discharge from the kiln is later melted in an electric arc furnace to produce ferrochrome. The common method of producing ferroalloys is to feed a mixture of pieces or sinters of ore and pieces of coke or coal into a submerged arc furnace for smelting. In this practice the smaller particles of ore must be excluded from the feed material because such particles cause the formation of bridges in the furnace. When such bridges collapse an undesired eruption of gases is caused which results in a consequent variation in the composition of both the tapped metal and the slag. A principal disadvantage of the present conventional practice is that the reactants are separated, that is, the ore pieces melt and dissolve in the slag pool under the arcs, while the coke pieces which are required for metallization, float in the upper part of the slag containing the metal oxides. The present commercial process requires that a relatively slow heat consuming reaction between two separated phases. Further, if the length of the arcs is excessive, an excess of ore will be fused resulting in incomplete metallization. In such cases the slag will cool and thicken to such an extent that a satisfactory separation from the molten metal can not be made. Conversely, if the arcs are excessively short, an insufficient amount of ore will be fused resulting in a decreased production rate. In addition, the fusion rate of the ores is dependent on a number of factors which are difficult to control. One of the more important factors is the size distribution of the ore and the carbonaceous material which may vary widely making it difficult to initially achieve favorable production conditions and even more difficult to maintain favorable production conditions over long periods of time. A further disadvantage of the present commercial processes is that the ore pieces become sticky when the fusion process starts and tend to form bridges which prevent the descent of the charge and cause undesirable gas eruptions upon collapse. Furthermore, the mixture of ore pieces and coke pieces tend to segregate during handling and also during charging into the arc furnace. Such segregation further contributes to the undesired formation of bridges. Another harmful effect of the bridges is that they force the hot carbon monoxide gas, which is developed in the slag pool and carries a partial pressure of metal vapors, to vent through channels in the burden, whereby a beneficial condensation of the vapors in the burden is prevented or diminished.

The present invention provides a means to utilize fine ores, fine concentrates of ores and fine carbonaceous material as raw materials in the production of silicon, iron and iron alloys, such as, ferromanganese, ferrochrome, ferrosilicon and ferrochromesilicon, in a submerged arc furnace. The present invention provides for a smoother furnace operation, increased metal recovery, and a more constant and predictable composition of the metal or metalloid and the slag. The foregoing advantages are achieved by initially forming self-reducing compacts which contain carbon-reducible oxides of metals or metalloids and a carbonaceous reducant and, if required, a slag forming additive. Accordingly the compacts, preferably, serve as the sole feed material for smelting operations carried out using a submerged arc furnace. A particularly important advantage of the present self-reducing compacts is that metallization of iron oxide and a substantial part of other useful oxides takes place as the compacts are heated to temperatures below the temperature at which fusion begins.

BRIEF DESCRIPTION OF THE INVENTION

The present invention relates to the use of self-reducing compacts as a feed material for a submerged electric arc furnace. The compacts are comprised of finely-divided carbon-reducible oxide materials, such as, the oxides of silicon, iron, manganese, chromium or nickel, or mixtures thereof, and a carbonaceous source material. The compacts may also contain a slag-forming additive. The particle size of the components is less than about 0.2 mm. The particles are mixed in appropriate weight ratios to yield the desired product, for example, silicon, iron, or iron alloy. Particles of carbonaceous source materials, such as, bituminous coal, subbituminous coal, lignite, anthracite, coke, char, or mixtures of such carbonaceous materials are mixed with particles of the selected metal or metalloid material to form a substantially uniform mixture. The carbonaceous source material is added in an amount by weight so that the tapped product will contain the amount of carbon required to produce the desired product. The carbonaceous source material is preferably selected so that there is a minimal change in the shape of the compacts during heating caused by the fusing of the coal. If required, a slag-forming additive, such as, silica, burnt lime, burnt dolomite, limehydrate, limestone, or mixtures of such additives, in the form of particles smaller than about 0.15 mm, may be added to and mixed with the particulate oxide material, preferably prior to the addition of the particulate carbonaceous material.

Water is then added and incorporated into the resultant mixture by alternately stirring and pressing, for example, by mulling, to produce densified agglomerates in the form of flakes or crumbs. Sufficient water is incorporated in the agglomerates that the subsequent compaction step, described below, squeezes out at least about one percent of the incorporated water. The watercontaining agglomerates are next compacted, suitably by means of double rolls which exert a maximum momentary pressure ranging from about 300 to about 4000 kg per linear cm of roll width. The resultant compacted material is aptly suited as a feed material for a submerged electric arc furnace.

The particle size of the components may be defined by reference to the standard Tyler Standard Screen scale. Accordingly particles smaller than about 0.2 mm pass a 65 mesh screen and particles smaller than about 0.15 mm pass a 100 mesh Tyler screen. As a sharp cut in the sizing of the particles is not practical on a commercial basis, and not essential for carrying out the present invention, not essential for carrying out the present invention, nominal size ranges are utilized. Thus, nominally −0.2 mm means that a minor weight percent of the particles may be larger than 0.2 mm.

It has been found that the water added to the mixture of the particles containing the carbon-reducible oxide material and of the carbonaceous particles is easily incorporated by alternatly stirring and pressing, as by mulling, such action provides a desirable uniform distribution of the water and densifies the moistened mixture into agglomerates which are particularly useful in the subsequent compaction step. The amount of water incorporated is sufficient that the later compaction step squeezes out at least about one percent of the water that was added. The freed water lubricates the pressing surfaces of the double rolls, thereby decreasing roll wear and aids in keeping the rolls clean. The moist densified agglomerates are suitably compacted by pressing between double rolls. The agglomerates are fed into the intake of the double rolls which exert an increasing pressure on the feed as the rolls move downwards until a maximum pressure is reached at the nip, that is at the point that the surfaces of the rolls are closest to each other. The pressure is then released suddenly as the contact surfaces of the rolls move away from each other and from the compacted product. It has been found that the compacted product expands to a slight degree after the pressure is released and that such expansion creates a highly desirable microporosity which will be discussed in further detail below. The transient maximum pressure is termed "maximum momentary pressure" in the course of the present description.

Double rolls having molds or pockets for shaping briquettes may advantageously be used. It has been found that the gap, or clearance, between the rolls, either smooth or with pockets, may be adjusted to preferably produce a continuous ribbon having the width of the rolls. The ribbon is subsequently divided into pieces having the desired size range for a feed material for a submerged arc furnace.

Smooth double rolls having ridges in any desired pattern which will cause grooves in the compacted ribbon may suitably be employed. Such grooves enable a rapid and easy division of the ribbon into convient sized compacts suited as a feed material for a submerged arc furnace.

In laboratory runs cylindrical compacts were made from various compositions by placing the densified agglomerates into the bore of a steel cylinder having an inside diameter of 12 mm. The agglomerates were compacted by means of a hydraulic piston. When compaction was stopped after the desired maximum pressure was reached there was an initial pressure drop which slowed over a period of about thirty seconds to a somewhat constant lower level. It is postulated that the initial pressure drop was caused by the particles slipping into a denser packing. Upon complete pressure release the compacted cylinder of material expanded slightly. The compact could be pushed out of the bore by a neglegible pressure on the piston. In order to simulate the maximum momentary pressure, that is, the sudden pressure release of the double rolls, the pressure on the compacted cylinder was immediately completely released as soon as the desired maximum pressure was reached.

The compacted cylinder was then removed from the bore and measurements taken. The compacted cylinder was then placed in a steel boat and inserted into a silica tube and heated to about 1000 degrees C. in an electric furnace. A gentle flow of carbon monoxide, as would form in the electric arc furnace, was applied to help move volatile matter escaping from the cylinder through the tube. When the temperature in the tube reached about 1000 degrees C. the power was shut off and the furnace lid was opened for quick cooling. It was found that cylinders containing higher oxides of manganese surprisingly maintained their shape and hardened with rising temperature. Normally mixtures fine manganese oxide and fine carbonaceous materials exhibit explosive properties. In the case of iron oxides, the analyses showed that the iron oxide in the orginal compacts had been substantially entirely metallized. Later the compacts were further heated in a seperate furnace. Metallization was found to continue and the compacts became plastic due to partial fusion in the range of between about 1220 to about 1300 degrees C. depending upon the type of metal oxides present in the compacts. These findings show that in practice the pasty compacts will desirably sink slowly into the molten pool of slag along with the suspended metal globules into the arc area of an electric arc furnace and will not form bridges. In accord the furnace operation will be smoother and the slag produced will have a lower and more uniform content of unreduced oxide materials than the slag produced in the conventional practice. These conditions enable the smelting operation to be carried out with lower power consumption, less fluctuation in the composition of the product and lower loss of metal or metalloid oxides in the slag.

It is also within the scope of the present invention that the self-reducing compacts be dried and indirectly preheated at temperatures between about 600 and about 1000 degrees C. before they are charged into the furnace. Suitably the moist compacts are passed, on their way to the arc furnace, through a heated chamber. The chamber is aptly heated by the combustion of volatile matter evolving from the compacts in the heated chamber and by the combustion of the gases, mainly carbon monoxide, from the arc furnace. Such preheating step results in a partial reduction of iron oxides and saves electrical energy which otherwise would be required in the arc furnace.

When self-reducing compacts were made in the laboratory and heated to about 1000 degrees C., it was found that the carbonization of the coal particles in the compacts provides more fixed carbon than usually is found in such coals by the normal laboratory test methods. It was also found that the higher the compaction pressure, the more fixed carbon is formed and the stronger the carbonized compacts become. Further it was found that if the dry compacts contain more than about eight percent by weight of volatile material introduced by coals and if the maximum momentary compaction pressure is higher than about 2000 kg per sq. cm., the compacts ruptured when heated to about 1000 degrees C. In such cases it was found that a lower compaction pressure prevents such rupture.

The carbonization of the compacts is completed before a temperature of 1000 degrees C. is reached. The reduction of the oxide materials, especially iron oxide, involves reactions with gases which are generated within the compact. In order to effectively react the gases must diffuse to the surface of the compact. Because of the unpredictability of such factors the mechanism of the reaction below about 1000 degrees C. can not be accurately predicted. However, at temperatures higher that about 1000 degrees C., carbon is the sole reductant and its effect can be quantified by the equation $MO + C = M + CO$.

The requirements of the reductants in the present process, as further illustrated in the examples below, was determined by the following method. The respective mixtures were compacted by the same maximum momentary pressure that would be used in a commercial operation. The compacts which resulted were then heated to about 1000 degrees C. and subsequently cooled. The amounts of unreduced oxide materials and the amounts of residual fixed carbon were determined by standard chemical analysis. Upon further heating of the compacts, the oxide materials, as shown by the analyses, were calculated to react solely with carbon to form carbon monoxide. Any additional amount of carbon that would be required to provide the desired carbon content in the end product was then calculated.

Unless otherwise noted the percentage figures in the following examples are percent by weight.

DETAILED DESCRIPTION AND PREFERRED EMBODIMENTS

EXAMPLE 1

Compacts Containing Coke Breeze for Smelting to Standard Ferromanganese

Standard ferromanganese is a well known and widely used alloy. Its production is usually accompanied with a throw-away slag. The alloy typically contains 74 to 76% Mn, about 7% C and less than 2% Si.

The fine manganese ore used in this example contained 44.55% Mn, 6.66% $H_2O$, 0.17% $CO_2$, 12.62% available oxygen, 3.31% Fe, 5.38% $SiO_2$, 8.15% $Al_2O_3$. The particle size distribution of the ore in weight percent was: 5.5% +65 mesh, 23.2% −65+100 mesh, 12.9% −100+200 mesh, 47.5% −200 mesh, and is defined as nominally −65 mesh. The fine iron ore used contained 64.11% total Fe, 0.50% FeO, 5.5% SiO, 1.47% Al O. The iron ore had a 1.38% ignition loss. The size distribution of the iron ore in weight percent was: 5.2% −32+65 mesh, 3.3% −65+100 mesh, 91.5% −100 mesh (nominally −65 mesh). The coke breeze used contained 88% fixed carbon and 5% H O. The coke particles had a size distribution in weight percent: 2% −35+65 mesh, 15% −65+100 mesh, 83% −100 mesh (nominally −65 mesh). The limehydrate used was in the form of a fine powder containing 74% CaO and 24.2% H O.

A compact in the form of a cylinder was made by thoroughly mixing 5.0 g of the manganese ore with 0.512 g of the iron ore. 0.744 g of powdery limehydrate was then rubbed onto particles of the mixed ores. The lime adhering to the ore particles.

Surprisingly it was found that if the slag-forming additives are mixed with, and made to adhere to the ore particles, the resulting compacts harden to a noticeably better extent when heated. In the case of basic additives, as in the present example it was found that limehydrate and burnt lime were more effective than finely ground limestone.

0.715 g of the coke breeze was then mixed with the limed ore particles. The resulting mixture was placed into a mortar and 1.2 ml of water was added and stirred into the mixture. The mixture was then pressed using a pestle. The stirring and pressing process was continued until densified agglomerates formed flakes and crumbs. The material was then packed into a steel cylinder having a 12 mm bore and compacted using a hydraulic piston which exerted a maximum momentary pressure of about 1700 kg per sq cm. A small amount of water was squeezed out. The extruded cylindrical compact weighed 7.75 g and measured 23.5 mm in length. The compact was then heated to about 1000 degrees C. over a period of two hours and subsequently cooled. The carbonized cylinder was found to have considerable strength. The shrinkage from the orginal length was 2 mm or about 8.5%. An analysis showed: 42.1% (2.204 g) total Mn, 10.4% (0.544 g) total Fe, 9.2% (0.482 g) metallic Fe and 7.41% (0.388 g) carbon.

Stoichiometrically it was calculated that the metallization of the unreduced 0.062 g Fe in the form of FeO and of the 2.204 g Mn in the form of MnO, according to the simplified equation, $(Mn,Fe)O + C = (Mn,Fe) + CO$, requires 0.495 g of carbon. Further, the carburization of both metals of ferromanganese containing 91.5% Mn,Fe and 7% carbon requires an additional 0.21 g of carbon. Therefore, a total of 0.705 g of carbon would be required to smelt the carbonized compact to a standard ferromanganese. The analysis shows a deficiency of 0.317 g of carbon. Thus, about 0.36 g of coke breeze would need to be added to the original 0.715 g. A total of 1.075 g coke breeze per 3.0 g standard ferromanganese product is required. In accord, the present process would require 358 kg of coke breeze to produce 1000 kg of standard ferromanganese. In contrast, about 480 kg of coke per 1000 kg of standard ferromanganese is required in the present commercial practice.

Heating the self-reducing compacts to temperatures higher than 1000 degrees C. rapidly increases the metallization of MnO. At about 1220 degrees C. metallic globules formed in the compacts and the formation of a liquid slag phase is started. The liquidity increased with further temperature increase and the compacts lost their shape and became pasty. This is a highly desirable property as in a submerged arc furnace such densified, highly metallized pasty materials would sink slowly into the slag-metal pool under the arcs without forming bridges. The pasty material also would introduce a relatively low and more uniform amount of MnO into the slag resulting in a smaller volume of CO and lesser amount of Mn vapor being carried away. The tapped product will then have a lower and more uniform carbon and silicon content and the tapped throw-away slag will have a lower and more uniform content of MnO. It is also to be noted that with the use of the present compacts the temperature in the slag-metal pool may be increased to a level higher than that used in the present conventional practice. This enables a ferromanganese with lower carbon and silicon content to be produced.

EXAMPLE 2

Compact Containing Bituminous Coal for Smelting to Standard Ferromanganese

In this example a high volatile bituminous coal was used as the reductant. The coal sample contained 50% fixed carbon, 41.2% volatile matter and 2% moisture and had the following size distribution: 6.8% −65+100 mesh, 93.2% −100 mesh. The procedure of Example 1 was used to prepare the compact. 5.0 g of the manganese ore was mixed with 0.512 g of the iron ore used in Example 1. The mixture was rubbed with 0.726 g of powdery limehydrate. 1.258 g of the bituminous coal was then added and the components mixed. The resulting mixture was densified to agglomerates, as in Example 1, using 1.1 ml water. The agglomerates were compacted by a maximum momentary pressure of about 1700 kg per sq cm. Some water was squeezed out. The green cylinder weighed 8.32 g and measured 28 mm long. After heating to about 1000 degrees C. and quick cooling as in Example 1, the resulting carbonized cylinder was found to weigh 5.347 g and to be 25.2 mm long, a shrinkage of 2.8 mm (about 10%). The analysis showed 42.19% (2.256 g) total Mn, 10.4% (0.556 g) total Fe, 9.1% (0.477 g) metallic Fe, and 10.33% (0.552 g) carbon. If the compacts are heated to temperatures higher than 1000 degrees C., as in a furnace operation, the 0.079 g Fe in the form of FeO will require 0.017 g of carbon and the 2.256 g Mn in the form of MnO will require 0.493 g of carbon. Carburization of the metals will require an additional 0.21 g of carbon. As only 0.552 g of carbon was added another 0.168 g of carbon (0.336 g high volatile bituminous coal) will need to be added to the ores. Therefore a total of 1.594 g coal would be required in the starting material. The production of 1000 kg of standard ferromanganese will require 531 kg of high volatile bituminous coal.

The same amount of fixed carbon (0.629 g) that was used in Example 1 in the form of coke breeze was also used in Example 2, but in the form of high volatile bituminous coal. After the carbonization of the compacts a deficiency of 0.317 g carbon was calculated in Example 1, compared to a deficiency of 0.168 g carbon in Example 2. It is postulated that the difference of 0.149 g carbon occured because part of the volatile matter within the compact of Example 2 was pyrolized to fixed carbon which was then deposited in the pores of the compact.

In a further related experiment densified agglomerates of the same composition as Example 2 were compacted by a higher maximum momentary pressure of about 2000 kg per sq cm. Such compaction caused a lower gas permeability of the green cylinder which was further diminished on heating by the newly formed fixed carbon to such an extent that the internal gas pressure caused cracks in the carbonized cylinder and in some cases split the cylinders into several pieces. This indicates that a lower maximum momentary pressure should be used if the content of volatile matter in the green compacts is increased, or if the green compacts are to be rapidly carbonized.

The above tests provide a simple emperical means by which the maximum momentary compaction pressure can be determined for a given composition.

EXAMPLE 3

Compacts Containing Coke Breeze and Bituminous Coal for Smelting to Standard Ferromanganese In this example a similar amount of fixed carbon, namely 0.629 g, as in the previous examples, was incorporated in the green cylinder. However, one third of the carbon was in the form of the high volatile bituminous coal as used in Example 2 and two thirds in the form of coke breeze as used in Example 1.

5.0 g of the manganese ore and 0.512 g of the iron ore particles of the compositions of Example 1 were mixed and rubbed with 0.721 g of powdery limehydrate. Subsequently 0.4194 g of bituminous coal and 0.4766 g of coke breeze were added and mixed resulting in a mixture weighing 7.219 g. The mixture was densified to agglomerates after the addition of 1 ml water as previously described. The agglomerates were compacted by a maximum momentary pressure of about 1700 kg per sq cm with a minor amount of water squeezed out. The resultant green cylinder was found to weigh 7.84 g and measured 24 mm in length. After heating to about 1000 degrees C. and cooling, the carbonized cylinder was found to weigh 5.218 g and to be 22 mm long. The longitudinal shrinkage was 2 mm (8.3%). The analysis showed 42.6%, (2.23 g) total Mn; 10.6%, (0.5553 g) total Fe; 9.4% (0.49 g) metallic Fe, and 8,49%, (0.443 g) carbon. It was calculated that at temperatures higher than 1000 degrees C. the 0.063 g Fe in the form of FeO will require 0.0135 g of carbon for metallization, that the 2.23 g Mn in the form of MnO will require 0.487 g of carbon, and that the carburization of both metals will consume 0.212 g of carbon, therefor smelting the carbonized cylinder to standard ferromanganese would require a total of 0.712 g of carbon. As only 0.443 g of carbon was left in the carbonized cylinder, 0.269 g of carbon (in the form of 0.57 g of bituminous coal or in the form of 0.305 g coke breeze) would be needed to be added at the time the mixture is prepared for densification. If the coke breeze is selected as the additional source of carbon, the 2.223 g of Mn (yielding about 3 g of standard ferromanganese) would require 0.4194 g bituminous coal and 0.7816 g coke breeze. Accordingly, the production of 1000 kg of standard ferromanganese would require 140 kg of high volatile bituminous coal and 260 kg of coke breeze.

EXAMPLE 4

Self-Reducing Compacts for Smelting to Iron

The same procedure as described above in regard to ferromanganese was used to make self-reducing iron oxide compacts for smelting to iron. Low-priced, suitable sources of iron oxide are soft iron ores, fines abraded from lumpy ores and from pellets, fine concentrates and dusts, e.g. such as carbon-containing blast furnace dust.

In this example particles of a magnetic concentrate containing 68.47% Fe, passing a 200 mesh Tyler sieve and weighing 10 g, were intensively mixed with 0.283 g of pulverized burnt lime. The resulting mixture was then mixed with particles of subbituminous boiler coal containing 55% fixed carbon and 35% volatile matter, nominally passing a 100 mesh screen and weighing 2.0 g. The resulting mixture, weighing 12.28 g, was mixed with 1.3 ml of water and densified by stirring and pressing into agglomerates which were compacted using a maximum momentary pressure of 1000 kg per sq.cm. into a cylinder weighing 13.36 g and measuring 39 mm in length. A minor amount of water was squeezed out by the compaction step. After heating and cooling as in Example 1 the carbonized cylinder was found to weigh 7.82 g and to measure 33 mm in length, a shrinkage of about 13.5%. If the compacts are further heated and processed for use as a feed material into a submerged arc furnace, the liquid iron produced would contain about 2.5% carbon. It is calculated that the production of 1000 kg. of liquid iron would require 1460 kg. iron ore concentrates and 292 kg. subbituminous coal.

The liquid iron obtained by smelting self-reducing compacts is free from tramp elements, such as Cu, Sn, Cr, Ni, and Mo, which are often present in low-priced scrap. The liquid iron produced from the present self-reducing compacts may readily be refined into high grade steel. High grade steel conventionally produced from melted scrap requires an expensive high-grade scrap as a starting material. It was estimated that the cost of producing the present self-reducing compacts and the power consumption for their subsequent smelting would be up to about 15% lower than conventional processes.

EXAMPLE 5

Self-Reducing Compacts for Smelting to Charge Chrome

Charge chrome is widely used for making stainless steel when made from a Transvaal ore, charge chrome typically contains about 53.4% Cr, 37.7% Fe, 5% carbon and 2.5% Si. A lower content of carbon and silicon is desirable in order to decrease the refining costs when ferrochrome is used for the production of stainless steel.

The self-reducing compacts of this example were produced by the procedure used in Example 1. 0.6 g of Transvaal ore containing 26.0% Cr and 28.23% Fe and nominally passing a 100 mesh screen was intensively mixed with 0.47 g of particulate quartzite nominally passing a 100 mesh screen. The resulting mixture was then mixed with 0.33 g of particulate coke breeze containing 88% fixed carbon and with 1.473 g of particulate high-volatile bituminous coal containing 57% fixed carbon and 33.0% of volatile matter having a size nominally passing a 100 mesh screen. The resulting mixture weighed 8.281 g. 0.5 ml of water was then incorporated into the mixture by mulling as in Example 1. 8.78 g of densified agglomerates were obtained which were then compacted using a maximum mometary pressure of 1700 kg per sq cm. About 0.09 g of water was squeezed out during compaction. A cylinder weighing 8.685 g and measuring 27.5 mm in length was obtained. After heating to about 1000 degrees C. and subsequent cooling, the carbonized cylinder was found to weigh 6.892 g and measure 26.8 mm in length. The linear shrinkage was 0.7 mm (2.5%). An analysis of the carbonized cylinder showed 22.6% total Cr, 3.9% metallized Cr, 15.9% total Fe, (13.3% metallic Fe), and 2.71% carbon. On this basis 1000 kg Cr produced in the form of charge chrome would require 4049 kg Transvaal ore, 670 kg high volatile bituminous coal and 216 kg coke breeze.

The above self-reducing cylinders were carbonized at 1000 degrees C. and subsequently heated to a higher temperature in a seperate furnace. The rate of metallization was found to accelerate with increase in temperature. At a temperature of about 1225 degrees C. substantially all of the iron and about 85% of the chrome were metallized into mixed carbides. At about 1300 degrees C. the compacts lost their shape and became plastic. As previously mentioned this is a highly desirable property for a feed material for a submerged arc furnace as such densified plastic bodies will sink slowly into the slag-metal pool in the arc area of the furnaceand the concentration of the chrome oxide in the slag will be relatively low. This is in sharp contrast to the present processes in which practically all of the metallization occurs in the slag pool. It is to be noted that higher temperatures may be maintained in the slag-pool thus enabling the production of a medium carbon ferrochrome having a low level of silicon along with a slag relatively low in chrome oxide.

The liquid ferrochrome product of the present invention is suitable for direct use in the production of stainless steel saving the cost of electrical energy now used for melting solid charge chrome.

EXAMPLE 6

Self-reducing Compacts for Smelting to Base Metal of Stainless Steel

In this example the self-reducing compacts contained iron in the form of iron ore and chromium in the form of chrome ore in a ratio that upon smelting would yield the base metal for stainless steel. Such compacts are a replacement of the expensive high quality iron scrap and ferrochrome usually used in the production of stainless steel. The compact in this example was made in accord with the procedure used in Example 1. 3.0 g of a particulate Transvaal ore as used in Example 5 was mixed with 4.49 g of the particulate iron ore used in Example 1. The mixure was then mixed with particulate, high volatile bituminous coal containing 59% fixed carbon and 41.2% volatile matter sized to nominally pass a 100 mesh Tyler screen, and with 0.8322 g of particulate coke breeze containing 88% fixed carbon sized to nominally pass a 100 mesh screen. 1.0 ml of water was then incorporated into the mixture by mulling as in Example 1 to obtain densified agglomerates. The agglomerates were then compacted using a maximum momentary pressure of 1400 kg per sq cm into a cylinder weighing 9.85 g and having a length of 26.5 mm. After heating to about 1000 degrees C. and subsequently cooling, the carbonized cylinder was found to weigh 6.52 g and to have a length of 27.5 mm. The cylinder had expanded 1 mm or about 3.8% of the orginal length. An analysis showed 12.4% total Cr, 12.0% non-metallic Cr, 49.2% total Fe, 6.7% non-metallic Fe, 42.5% metallic Fe, 4.08% carbon.

From the foregoing data it was calculated that 1000 kg of a base metal for the production of stainless steel containing 19.7% Cr and 2.0% carbon will require 735 kg of Transvaal ore, 995 kg of iron ore fines, 256 kg of high volatile bituminous coal and 197 kg of coke breeze. If a cost of $32.00 per Mkwh is assumed, the production cost of 1000 kg of the base metal produced by the present process would be about 20% lower than the cost of melting imported charge chrome and high grade scrap as utilized in the present commercial processes.

It is also to be noted that the smelting of self-reducing reducing compacts in a submerged arc furnace enables the process to be carried on in a continuous manner with relatively minor fluctuations in power comsumption. This makes possible the use of low-priced self-baking electrodes. The product produced by the process and the associated slag may be intermittently tapped. The tapped product may be collected and stored for later decarbonization and refining in batches. This is in accord with the present commercial practice in which oxygen is used in the decarburization process. If desired, the heat generated by such process may be utilized to melt iron scrap or stainless steel scrap which may be used in the process.

In contrast, the prior art processes for producing steel from scrap and for producing stainless steel are batch operations which require expensive graphite electrodes and involve wide fluctuations in power consumption as a high power demand is encountered during their melt down and a low power demand is encountered during refining.

EXAMPLE 7

Self-reducing Compacts for Smelting to 50% Ferrosilicon

The procedure of making compacts described in Example 1 was used. 2.5 g of silica flour passing a 100 mesh screen was mixed with 1.9 g of the particulate iron ore of Example 1. The resulting mixture was mixed with 1.019 g of particulate coke breeze as used in Example 3 and with 0.507 g of particulate high volatile bituminous coal containing 57% fixed carbon and 33% volatile matter and nominally passing a 100 mesh screen. 0.8 ml of water was added to the mixture and incorporated as previously described to obtain densified agglomerates which were then compacted at a maximum momentary pressure of about 1700 kg per sq cm into a cylinder weighing 6.49 g and having a length of 23.2 mm. During compaction 0.08 g of water was squeezed out. After heating to about 1000 degrees C. and cooling as described in the previous examples, the resulting carbonized cylinder was found to weigh 4.52 g and to measure 23.4 mm in length. A slight expansion had occurred during carbonization. The analysis showed 26.5% total Si, no metallic Si, 27.5% total Fe, (25.9% metallic Fe) and 12.14% carbon. On this basis and assuming that the loss of SiO in the slag will be balanced by the silica content in the coal and coke ash, it was calculated that the production of 1000 kg of 50% ferrosilicon would require 1024 kg of fine quartzite, 778 kg of coke breeze and 208 kg of high volatile bituminous coal.

The cost of the compacts containing the above raw materials was calculated and found to be about 23% lower than the cost of a conventional charge consisting of quartz gravel, iron punchings and sized coke pieces. This cost benefit mainly results from replacement of expensive iron punchings by inexpensive iron ore fines. The production of 1000 kg of 50% ferrosilicon would require about 5000 kwh using conventional methods. The improved recovery rate and the higher power factor resulting from the present invention would considerably lower the power requirement.

Self-reducing compacts for the production of 75% ferrosilicon can be made in a similar manner.

EXAMPLE 8

Self-reducing Compacts for Smelting to Silicon

The procedure for making compacts was the procedure used in Example 1. The amount of reducant required was determined by mixing 3.6 g of silica flour (97% $SiO_2$, 2% impurities, 1% moisture) as used in Example 7 with 0.784 g of particulate coke breeze as used in Example 1 and 2.34 g of high volatile bituminous coal (57% fixed carbon, 33% volatile matter and 5% ash) of a size nominally passing a 100 mesh Tyler screen. 1.1 ml of water was then incorporated by stirring and pressing to obtain densified agglomerates. The agglomerates were then compacted using a maximum momentary pressure of about 1350 kg/ sq cm into a cylinder weighing 7.62 g and measuring 36.6 mm in length. About 0.05 ml of water was squeezed out during the compaction step. The cylinder was then heated to about 1000 degrees C. and subsequently cooled as in the previous examples. The resulting carbonized cylinder was found to weigh 5.88 g and to measure 35 mm in length, a shrinkage of 1.6 mm or about 4.4%. The cylinder had a density of 1.31. As SiO was not reduced the carbonized cylinder contained 3.492 g $SiO_2$, 2.133 g carbon and 0.255 g ash and silica impurities. According to the equation $SiO_2 + 2 C = Si + 2 CO$, 3.492 g $SiO_2$ would require 1.397 g of carbon for metallization. By the addition of 10%, or 0.139 g, of carbon to compensate for burn-out during smelting and subtracting 10%, or 0.186 g, Si to compensate for the loss of SiO by evaporation, it was calculated that the production of 1.676 g of Si would require 1.537 g of carbon. However, the above amounts of coke breeze and high volatile bituminous coal had introduced 2.024 g of carbon. Thus an excess of 0.498 g of carbon had been utilized. Alloting the excess to the two reducants in proportion to their carbon content and subtracting the corresponding amount from the amounts actually used, it was calculated that 1000 kg of silicon would require 354 kg of coke breeze and 1060 kg of high volatile bituminous coal. In contrast about 1300 kg of coke in the form of sized pieces would be required in the present conventional practice.

In another example one half of the fixed carbon was supplied in the form of high volatile bituminous coal and the other half in the form of subbituminous coal. The particle sizes, compaction and carbonization were similar to that used in Example 8. After heating it was found that the carbonized cylinder had expanded to a porous structure having a density of 0.94. The decrease in density was found to be caused by fused bituminous coal. As it is preferred to have dense, strong compacts which do not significantly expand during carbonization, the amount of volatile bituminous coal used as a carbonaceous source material should not exceed the amount which will cause the compacts to decrease in density.

In summary the present invention provides an economical method to produce silicon, iron and ferroalloys. The present process employs comparatively inexpensive starting materials and requires lower production costs and less energy.

The present invention has been described with respect to specific illustrations, embodiments and working examples. However, it should not be considered to be limited to these as it will be evident to one of skill in the art that with the present specification before him he will be able to visualize modifications, substitutes and equivalents without departing from the spirit of the invention.

What is claimed is:

1. A process of producing a silicon, iron or ferroalloy product which comprises the steps of:
   (a) preparing a particulate, carbon-reducible oxide starting material, having a nominal particle size of less than 0.2 mm, said oxide starting material containing at least one carbon-reducible oxide of iron, silicon, manganese, chromium or nickel,
   (b) mixing said oxide starting material with a sufficient amount of a particulate carbonaceous source material, having a nominal particle size of less than 0.2 mm, so that the carbon available from said carbonaceous source material is sufficient to react with said oxide starting material to produce a selected, desired product,
   (c) adding a sufficient amount of water by stirring and pressing to produce a densified agglomerate product,
   (d) compacting said densified agglomerate product under a maximum momentary pressure of from about 300 kg to about 4000 kg per sq cm, whereby at least 1% of said added water is squeezed out, thereby producing a compacted material, and, (e) smelting said compacted material, as the sole feed, in a submerged arc furnace to obtain said selected, desired product.

2. The process of claim 1 wherein a particulate slag-forming additive, having a particle size less than about 0.15 mm, is admixed with said mixture of carbon-reducible oxide material and said carbonaceous source material prior the the addition of said water.

3. The process of claim 1 wherein a particulate slag-forming additive, having a particle size less than about 0.15 mm, is admixed with said carbon-reducible oxide material prior to mixing with said carbonaceous source material.

4. The process of claim 1 wherein said carbonaceous material is selected from bituminous coal, subbituminous coal, lignite, anthracite, coke, char, blast furnace dust, or mixtures thereof.

5. The process of claim 1 wherein said carbonaceous source material is at least partially bituminous coal in an amount insufficient to cause expansion of said compacted material prior to smelting.

6. The process of claim 2 wherein the slag-forming additive is selected from burnt lime, burnt dolomite, limestone, dolomite, silica, or mixtures thereof.

7. The process of claim 1 wherein said compacting step is carried out by means of pocketed double rolls and the compacted product is in the form of briquettes.

8. The process of claim 1 wherein said compacting step is carried out by means of double rolls adjusted to produce a continuous compacted ribbon.

9. The process of claim 7 wherein said rolls have ridges thereon forming grooves in said compacted ribbon facilitating division of said compacted ribbon.

10. The process of claim 1 wherein said compacted material is heated to about 1000 degrees C. prior to smelting.

11. The process of claim 10 wherein said heating is indirect.

* * * * *

UNITED STATES PATENT AND TRADEMARK OFFICE
CERTIFICATE OF CORRECTION

PATENT NO. : 4,613,363
DATED : September 23, 1986
INVENTOR(S) : Fritz O. Wienert It is certified that error appears in the above-identified patent and that said Letters Patent is hereby corrected as shown below:

IN THE ABSTRACT:

Line 16 delete "a".

IN THE SPECIFICATION:

Column 1, line 23, change "incoprora-" to --incorpora- --.

Column 1, line 41, change "process requires" to --processes requires--.

Column 1, line 41, delete "that".

Column 1, line 42, between "heat" and "consuming" add a hyphen.

Column 2, line 15, between "slag" and "forming" add a hyphen.

Column 2, line 43, change "required" to --desired--.

Column 2, line 43, delete "to produce the desired product".

Column 3, lines 4 and 5, delete "not essential to carrying out the present invention, Column 3, line 49, delete "convient" and insert --convenient--.

Column 3, line 52, insert a comma after "runs".

UNITED STATES PATENT AND TRADEMARK OFFICE
CERTIFICATE OF CORRECTION

PATENT NO. : 4,613,363
DATED : September 23, 1986
INVENTOR(S) : Fritz O. Wienert It is certified that error appears in the above-identified patent and that said Letters Patent is hereby corrected as shown below:

Column 8, lines 64 and 65, delete the period after "kg".

Column 9, line 15, insert a period after "steel" and change "when" to --When--.

Column 9, line 26, change "0.33" to -- 0.336--.

Column 9, line 58, separate "furnaceand" into --furnace and--.

Column 9, line 63, change "slag-pool" to --slag pool--.

Column 10, line 18, after "with", insert --0.7214g--.

Column 10, line 19, change "59" to --50--.

Column 10, line 20, after "matter" add a comma.

Column 10, line 22, after "carbon" insert a comma.

Column 10, line 38, insert "18/8" before --stainless--.

Column 10, line 53, change "may" to --will--.

Column 10, line 54, change "may be" to --is--.

Column 10, line 59, before "which" insert a period.

Column 10, line 59, delete "which".

UNITED STATES PATENT AND TRADEMARK OFFICE
CERTIFICATE OF CORRECTION

PATENT NO. : 4,613,363

DATED : September 23, 1986

Page 3 of 3

INVENTOR(S) : Fritz O. Wienert

It is certified that error appears in the above-identified patent and that said Letters Patent is hereby corrected as shown below:

Column 10, line 60, delete entire line.

Column 11, line 29, delete "coke breeze" and insert --iron ore--.

Column 11, line 30, before the period add --and 672 kg coke breeze--.

Column 11, line 38, separate "about5000".

Column 11, line 50, change "SiO" to --$SiO_2$--.

Column 11, lines 66 and 67, on each occurrence, change "SiO" to --$SiO_2$--.

Column 11, line 66 delete the space between "2.133 " and "g".

Column 12, line 1, two occurances, change "SiO" to --$SiO_2$--.

Column 12, line 10, delete "utilized" and insert --added--.

Column 12, line 17, delete "would be" and insert --are--.

Signed and Sealed this

Tenth Day of March, 1987

Attest:

DONALD J. QUIGG

Attesting Officer

Commissioner of Patents and Trademarks